United States Patent [19]
Lyon

[11] Patent Number: 6,012,845
[45] Date of Patent: Jan. 11, 2000

[54] SELF-COMPENSATING HYDROSTATIC BEARING WITH TAPE

[75] Inventor: Gregory S. Lyon, Mamaroneck, N.Y.

[73] Assignee: Thomson Industries Inc., Port Washington, N.Y.

[21] Appl. No.: 09/143,017

[22] Filed: Aug. 28, 1998

[51] Int. Cl.[7] .............................. F16C 32/06; F16C 43/02
[52] U.S. Cl. ........................................... 384/12; 29/898.02
[58] Field of Search ................................ 384/12, 13, 100; 29/898.02, 898.03

[56] References Cited

U.S. PATENT DOCUMENTS

| | | | |
|---|---|---|---|
| 2,449,297 | 9/1948 | Hoffer | 384/115 |
| 3,582,159 | 6/1971 | Uhtenwoldt | 384/12 |
| 3,754,799 | 8/1973 | Hedberg | 384/12 |
| 3,900,233 | 8/1975 | Thomson | 384/43 |
| 4,080,009 | 3/1978 | Marathe et al. | 384/12 |
| 4,351,574 | 9/1982 | Furukawa et al. | 384/8 |
| 4,368,930 | 1/1983 | Duchaine | 384/12 |
| 4,932,067 | 6/1990 | Pester et al. | 384/45 |
| 4,978,233 | 12/1990 | Stotzel et al. | 384/12 |
| 5,010,794 | 4/1991 | Klager | 384/12 X |
| 5,104,237 | 4/1992 | Slocum | 384/12 |
| 5,267,796 | 12/1993 | Nonaka et al. | 384/13 X |
| 5,484,208 | 1/1996 | Kane et al. | 384/12 |

*Primary Examiner*—Thomas R. Hannon
*Attorney, Agent, or Firm*—Dilworth & Barrese

[57] ABSTRACT

A self-compensating linear motion bearing assembly is provided including a bearing carriage configured to be supported on a support rail and having at least one bearing surface or race. The bearing carriage is adapted to receive a supply of pressurized hydrostatic fluid. A carriage tape is bonded to the bearing surface such that the tape is positioned between the bearing carriage and support rail. The carriage tape is constructed from a self-lubricating high performance polymer. In the event that hydrostatic fluid pressure is lost, the carriage tape permits substantially frictionless movement between the carriage and the support rail to prevent damage to the bearing assembly and/or to the load supported thereon. In a preferred embodiment, the bearing carriage includes a pair of upper and lower bearing races. Carriage tape having a compensator formed therein is bonded to each of the bearing races. Each compensator includes a supply port, a collector and an elongated relief or pocket. By forming the compensators in the carriage tape and subsequently bonding the tape to the bearing races, the costs and complexities involved in manufacturing the bearing assembly are greatly reduced.

19 Claims, 8 Drawing Sheets

SELF-COMPENSATING HYDROSTATIC BEARING WITH TAPE

BACKGROUND

1. Technical Field

The present invention relates to a linear motion hydrostatic bearing assembly and, more particularly, to a self-compensating linear motion hydrostatic bearing assembly including a bearing carriage having a self-lubricating tape bonded to bearing surfaces of the carriage, and compensators formed in the bearing tape.

2. Background of Related Art

Linear motion hydrostatic bearings are well known and have been used for many years for the near frictionless movement of masses. Hydrostatic bearings are characterized as having excellent low friction, accuracy, and repeatability characteristics, with a theoretically infinite life. Hydrostatic bearings also have excellent damping characteristics which result from hydrostatic fluid acting as a shock absorber between the apparatus to which the bearing is associated and an applied load.

Typically, hydrostatic bearings maintain the distance between a bearing race and a support rail by supplying a thin pressurized film of fluid into the gap between the bearing race and the support rail. One type of hydrostatic bearing is a self-compensating hydrostatic bearing. Self-compensating hydrostatic bearings respond automatically to a change in bearing gap by changing the flow of fluid to pockets positioned along the bearing races.

Generally, self-compensating hydrostatic bearings have compensators formed on the internal surfaces of the bearing. Each compensator includes a collector, a supply groove, and a pocket consisting of a relief extending longitudinally along the length of a bearing carriage. Several processing techniques are currently used to form the compensators including injection molding and die casting on a collapsible core, electro-discharge machining and conventional machining. However, these techniques are complex, time consuming and expensive.

Additionally, self-compensating hydrostatic bearings have races subject to wear or damage upon the advent of a loss of hydrostatic fluid pressure. Since upon the loss of hydrostatic fluid pressure, a bearing carriage is no longer supported on a film of fluid above a support rail, galling and other damage to the being race may occur.

Accordingly, a need exists for an improved self-compensating hydrostatic bearing which can be manufactured without the costs and complexity associated with conventional techniques. Further, a need also exists for an improved self-compensating hydrostatic bearing with the ability to de-sensitize the effects of a loss of hydrostatic pressure.

SUMMARY

In accordance with the present disclosure, a self-compensating hydrostatic linear motion bearing assembly is provided. The bearing assembly includes a bearing carriage configured to be supported on a support rail and having at least one bearing surface or race. The bearing carriage is adapted to receive a supply of pressurized hydrostatic fluid. A carriage tape is bonded to the bearing surface such that the tape is positioned between the bearing carriage and support rail. The carriage tape is constructed from a self-lubricating high performance polymer. In the event that hydrostatic fluid pressure is lost, the carriage tape permits substantially frictionless relative movement between the carriage and support rail to prevent damage to the bearing assembly and/or to the load supported thereon.

In a preferred embodiment, the bearing carriage includes a pair of upper and lower bearing races. Carriage tape having a compensator formed therein is bonded to each of the bearing races. Each compensator includes a supply port, a collector and an elongated relief or pocket. By forming the compensators in the carriage tape and subsequently bonding the tape to the bearing races, the costs and complexities involved in manufacturing the bearing assembly are greatly reduced.

BRIEF DESCRIPTION OF THE DRAWINGS

Various preferred embodiments are described herein with reference to the drawings, wherein.

DETAILED DESCRIPTION OF PREFERRED EMBODIMENTS

Figure 1:
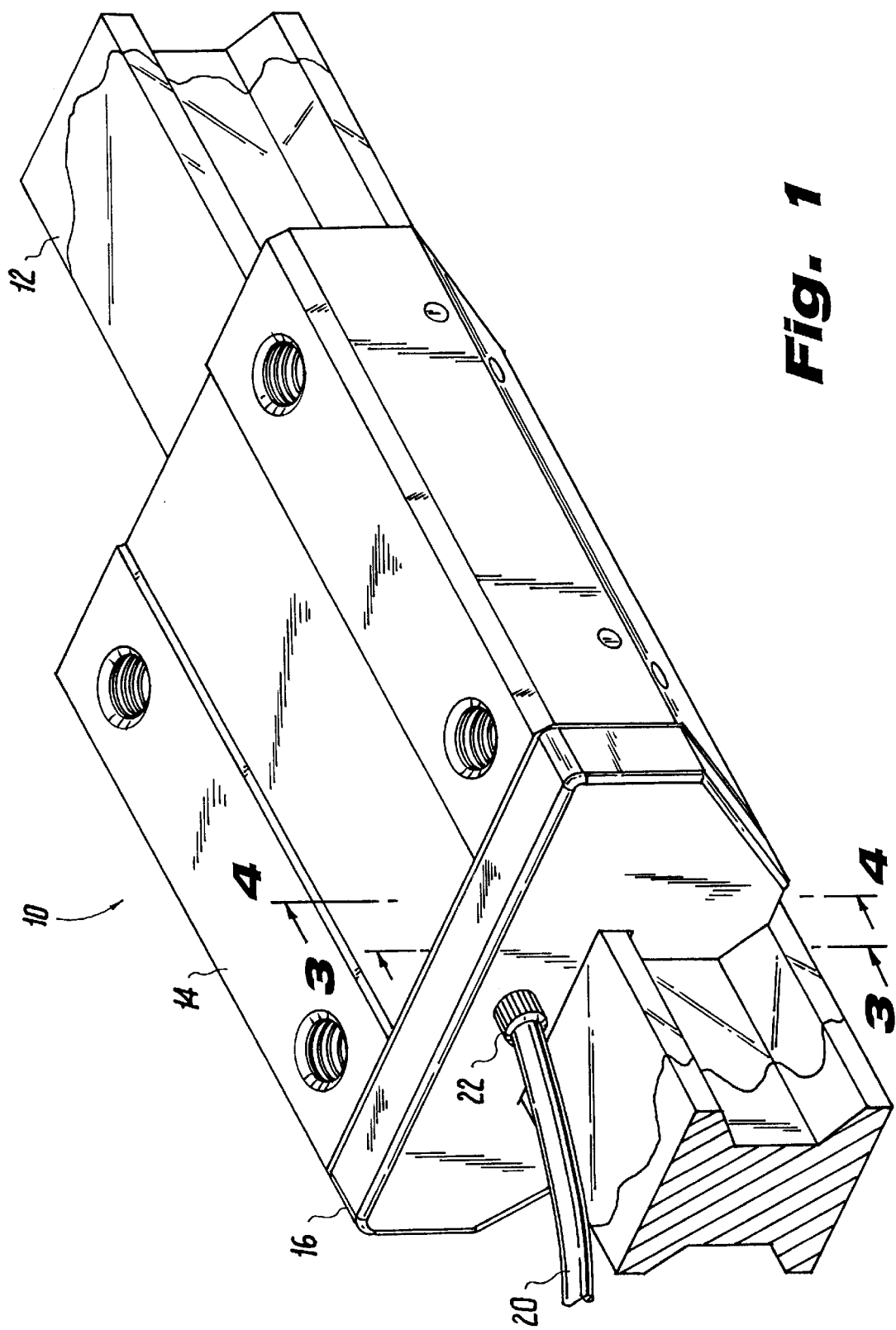
FIG. 1 is a perspective view of one embodiment of the presently disclosed self-compensating linear motion hydrostatic bearing assembly positioned on a support rail.

Preferred embodiments of the presently disclosed self-compensating linear motion hydrostatic bearing assembly will now be described in detail with reference to the drawings in which like reference numerals designate identical or corresponding elements in each of the several views.

FIG. 1 illustrates one embodiment of the presently disclosed self-compensating linear motion hydrostatic bearing assembly, shown generally as 10. Bearing assembly 10 is slidably supported on support rail 12. Briefly, bearing assembly 10 includes a bearing carriage 14, a bearing manifold 16 and a hydrostatic fluid supply hose 20. Bearing manifold 16 is secured to one end of bearing carriage 14 and includes a fitting (not shown) adapted to receive one end 22 of supply hose 20. The other end of supply hose 20 communicates with a pressurized source of hydrostatic fluid (not shown).

Figure 2:
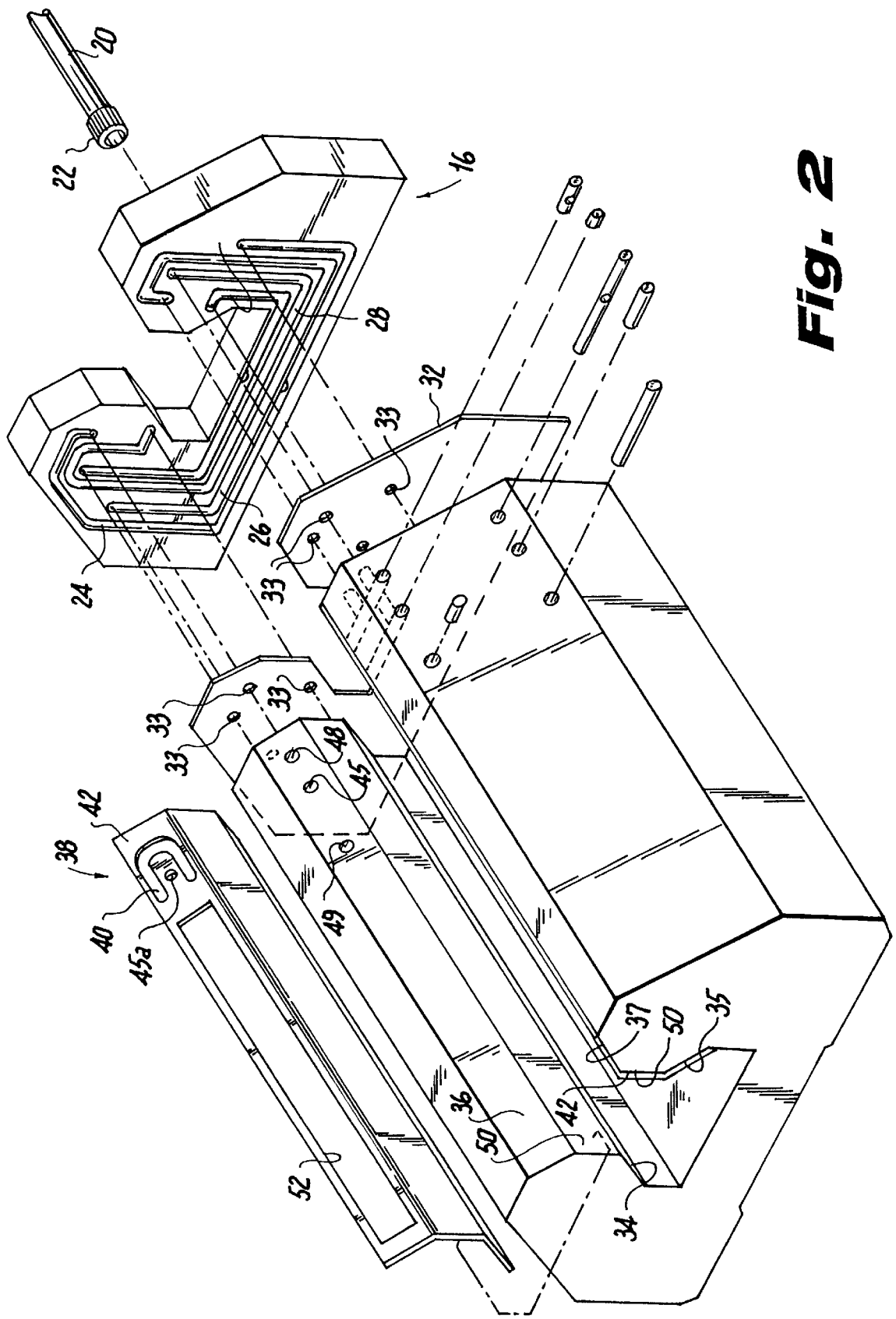
FIG. 2 is a perspective view with parts separated of the self-compensating linear motion hydrostatic bearing assembly shown in FIG. 1.

Referring to FIG. 2, bearing manifold 16 includes four compensation channels 24, 26, 28 and 30. The channels may be milled or otherwise formed in the manifold but are preferably investment cast. A gasket 32 can be positioned between manifold 16 and bearing carriage 14 to provide sealing therebetween. Alternately a gasket need not be provided. Preferably, bearing manifold 16 is brazed onto bearing carriage 14, although other attachment techniques maybe used, e.g., screws, clamps, etc. Manifold 16 is secured to bearing carriage 14 to enclose each of the compensation channels 24, 26, 28 and 30 to provide four distinct channels within the manifold 16. When a gasket is provided, holes 33 must be formed in the gasket to provide access to compensation channels 24, 26, 28 and 30.

Figure 3:
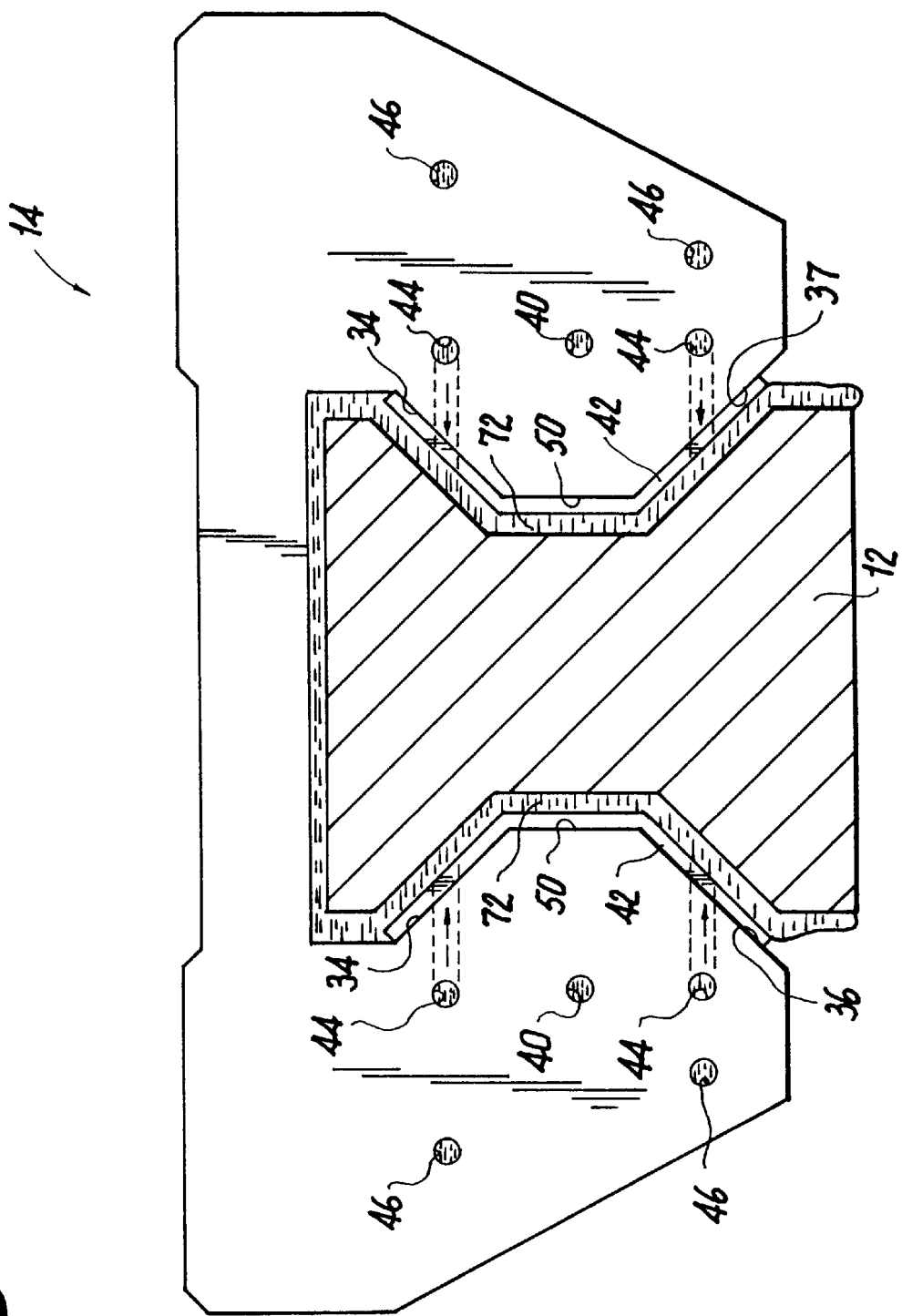
FIG. 3 is a cross-sectional view taken along section line 3—3 of FIG. 1.

Referring also to FIG. 3, bearing carriage 14 includes a pair of upper bearing races 34 and 35 and a pair of lower bearing races 36 and 37. Upper bearing races 34 and 35 are angled downwardly at an angle of about 30° to about 60° towards the centerline of carriage 14 and lower bearing races 36 and 37 are angled upwardly at an angle of about 30° to about 60° towards the centerline of carriage 14. Preferably, upper and lower bearing races define an angle of about 45° with respect to a vertical plane extending through the longitudinal centerline of the carriage, although other bearing carriage configurations are envisioned. A truncated central portion 50 of carriage 14 is positioned between each respective upper and lower bearing race. Each bearing race includes a return port 48, a working port 49 and a supply port 45. Supply ports 45 are connected to a supply of pressurized hydrostatic fluid by supply channels 40 (See FIG. 3) formed in carriage 14 and supply hose 20.

Carriage tape 42 is bonded to bearing races 34–37 using a high strength adhesive, such as an epoxy or cyanoacrylate. Preferably, one sheet of carriage tape 42 is dimensioned and configured to cover upper and lower bearing races 34 and 36 and another sheet of carriage tape 42 is dimensioned and configured to cover upper and lower bearing races 35 and 37. Alternately, four separate sheets of tape could be used, one sheet being bonded to each bearing race. Carriage tape 42 is preferably processed from a high performance polymer, such as fluorocarbon filled with polytetrafluoroethylene (PTFE). Each sheet of carriage tape 42 is formed, using a technique such as stamping, to define a compensator 38 on each bearing race. The tape may be finished by either milling or grinding to a finished dimension to achieve a close fit with support rail 12.

Figure 4:
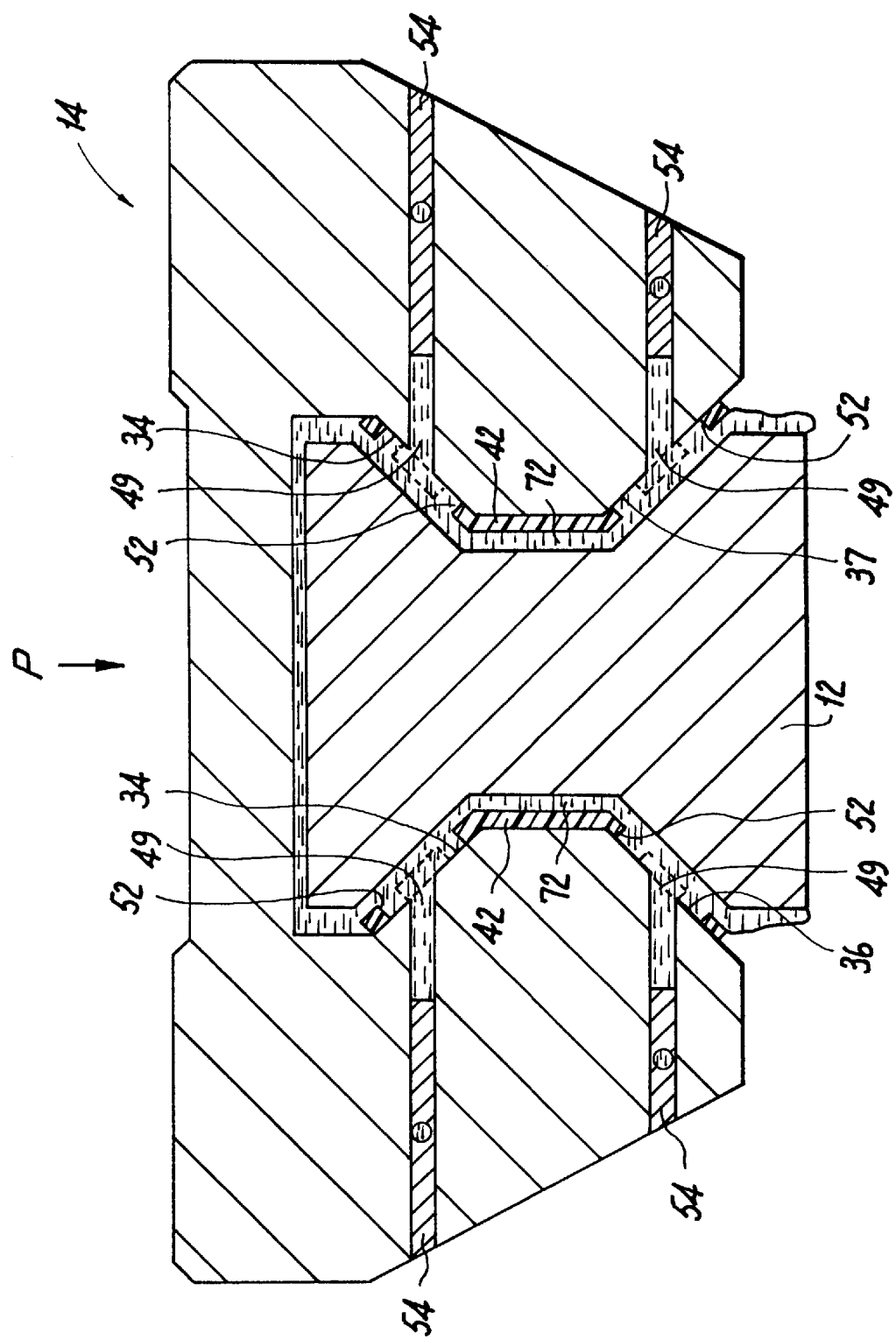
FIG. 4 is a cross-sectional view taken along section line 4—4 of FIG. 1.

Each compensator 38 includes a substantially U-shaped collector 40 which communicates with return port 48, a supply opening 45a which communicates with supply port 45 and, a longitudinally extending relief or pocket 52 which communicates with a working port 49. Return ports 48, supply ports 45 and, working ports 49 are formed in bearing carriage 14 along the bearing races. Each supply port 45 is connected to a supply of pressurized hydrostatic fluid (not shown) via supply channels 40 which extend through manifold 16 and carriage 14. Each working port 49 communicates with one end of a compensation channel via working channels 44 formed in bearing carriage 14 and each return port 48 communicates with the other end of a compensation channel via return channels 46 formed in bearing carriage 14. Referring to FIGS. 2 and 4, the channels formed in the bearing carriage may be formed by drilling holes through the sidewalls of bearing carriage 14 and sealing the outer ends of the holes with plugs 54.

Referring to FIGS. 1–4, during operation of linear motion hydrostatic bearing assembly 10, pressurized hydrostatic fluid is supplied from a pressurized source of hydrostatic fluid (not shown) to supply channel 40 via supply hose 20. Hydrostatic fluid flows through each of supply ports 45 and through supply opening 45a into gap 72 defined between carriage tape 42 and support rail 12. The hydrostatic fluid flows from supply opening 45a across gap 72 into return slot 48a where it is directed into return port 48. Hydrostatic fluid flows from return port 48 into return channels 46 into one of the compensation channels 24, 26, 28 or 30 and is directed to a working port 49 formed on the bearing race located diagonally of the bearing race from which the hydrostatic fluid was originally supplied. For example, hydrostatic fluid supplied to bearing race 34 is returned to bearing race 37 (FIG. 4). When a load P is applied to bearing carriage 14 and carriage 14 is forced downwardly towards rail 12, the size of gap 72 between carriage tape 42 on bearing races 36 and 37 and support rail 12 increases while the size of gap 72 between carriage tape 42 and bearing races 34 and 35 and support rail 12 increases. The change in the size of the gaps 72 causes a differential in the hydrostatic fluid flow between supply ports 45 and return ports 48 on each bearing surface to effect a stabilizing pressure differential. In the event of a loss of hydrostatic fluid pressure, carriage tape 42 is self-lubricating and will prevent damage to the bearing assembly and/or the load supported thereon.

Figure 5:
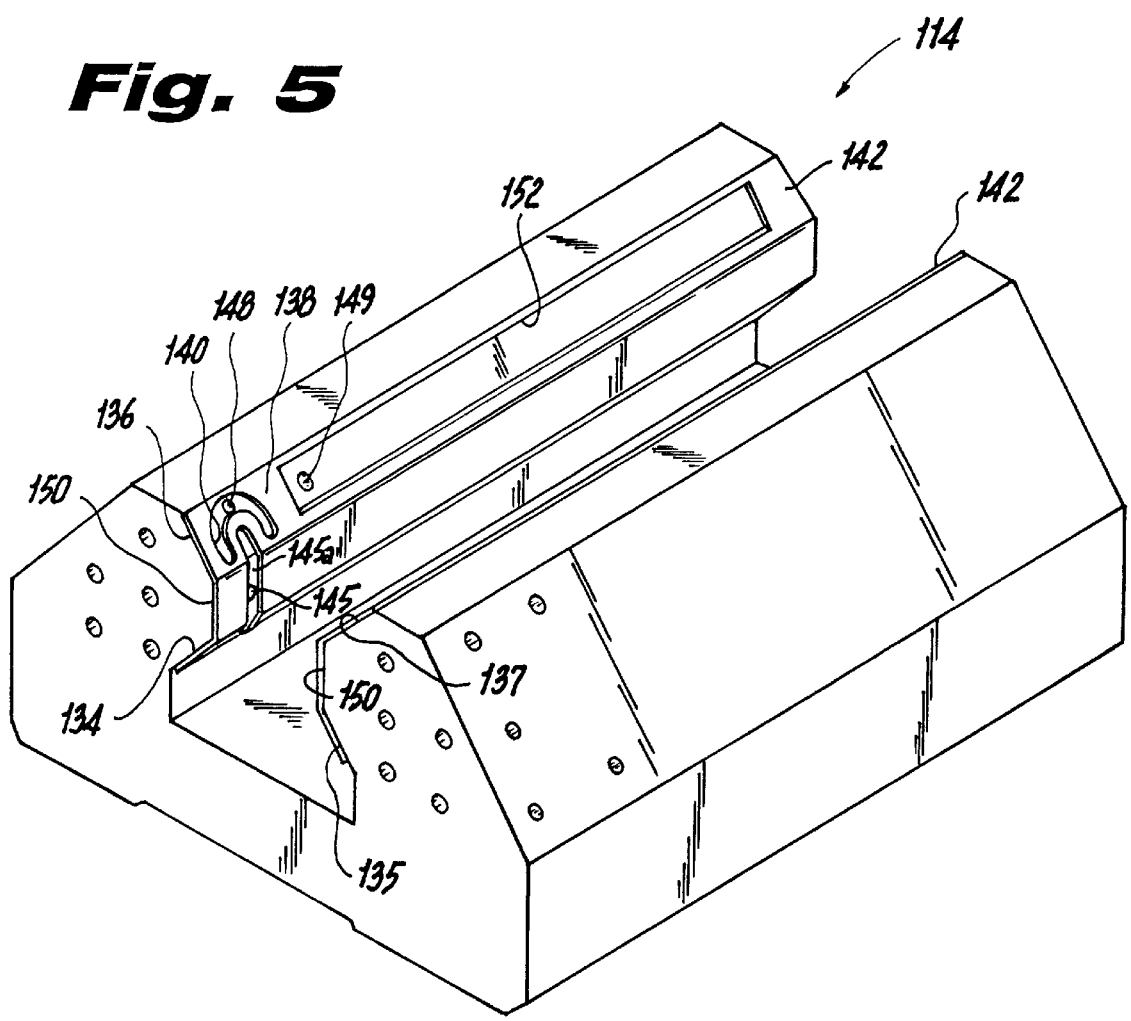
FIG. 5 is a perspective view of an alternate embodiment of the presently disclosed self-compensating linear motion hydrostatic bearing assembly.
Figure 6:
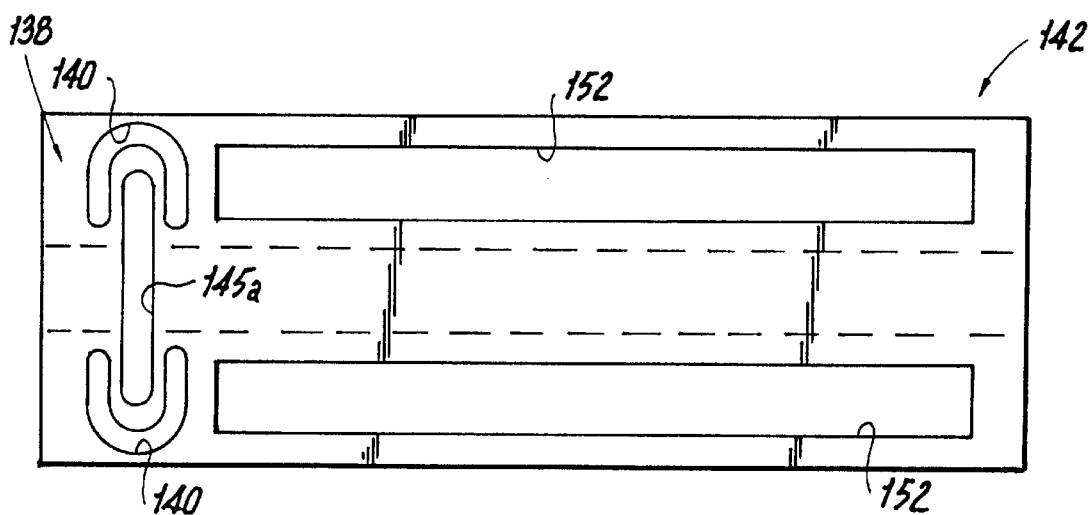
FIG. 6 is a plan view of the bearing tape of the self-compensating bearing assembly shown in FIG. 5.

FIGS. 5 and 6 illustrate an alternate embodiment of the bearing carriage shown generally as 114. Bearing carriage 114 includes a pair of upper bearing races 134 and 135 and a pair of lower bearing races 136 and 137. Upper bearing races 134 and 135 are angled downwardly at an angle of about 30° to about 60° towards the centerline of carriage 114 and lower bearing races 136 and 137 are angled upwardly at an angle of about 30° to about 60° towards the centerline of carriage 114. Preferably, upper and lower bearing races define an angle of about 45° with respect to a vertical plane extending through the longitudinal centerline of the carriage, although other bearing carriage configurations are envisioned. A truncated central portion 150 of carriage 114 is positioned between each respective upper and lower bearing race. Each bearing race includes a return port 148 and a working port 140. A supply port 145 is formed on each truncated central portion 150 of carriage 114. The supply ports 145 are connected to a supply of pressurized hydrostatic fluid by supply channels 140 formed in carriage 114 and supply hose 120.

Carriage tape 142 is bonded to bearing races 134–137. As discussed above with respect to carriage tape 42, preferably, one sheet of tape is dimensioned and configured to cover upper and lower bearing races 134 and 136 and another sheet of tape 142 is dimensioned and configured to cover upper and lower bearing races 135 and 137. Bearing tape 142 can be processed from a high performance polymer and formed using a technique such as stamping as discussed above.

Each sheet of bearing tape is shaped to define a compensator 138 on each bearing race. Compensators 138 each include a substantially U-shaped collector 140 which communicates with return port 148 and a longitudinally extending relief or pocket 152 which communicates with working port 149. A supply groove 145a which communicates with supply ports 145 extends vertically between collectors 140 positioned on adjacent upper and lower bearing races. Supply groove 145a distributes hydrostatic fluid from a single supply port 145 between two compensators. Operation of a self-compensating linear motion bearing assembly including carriage 114 is substantially identical to operation of bearing assembly 10 and will not be discussed in further detail herein.

Figure 7:
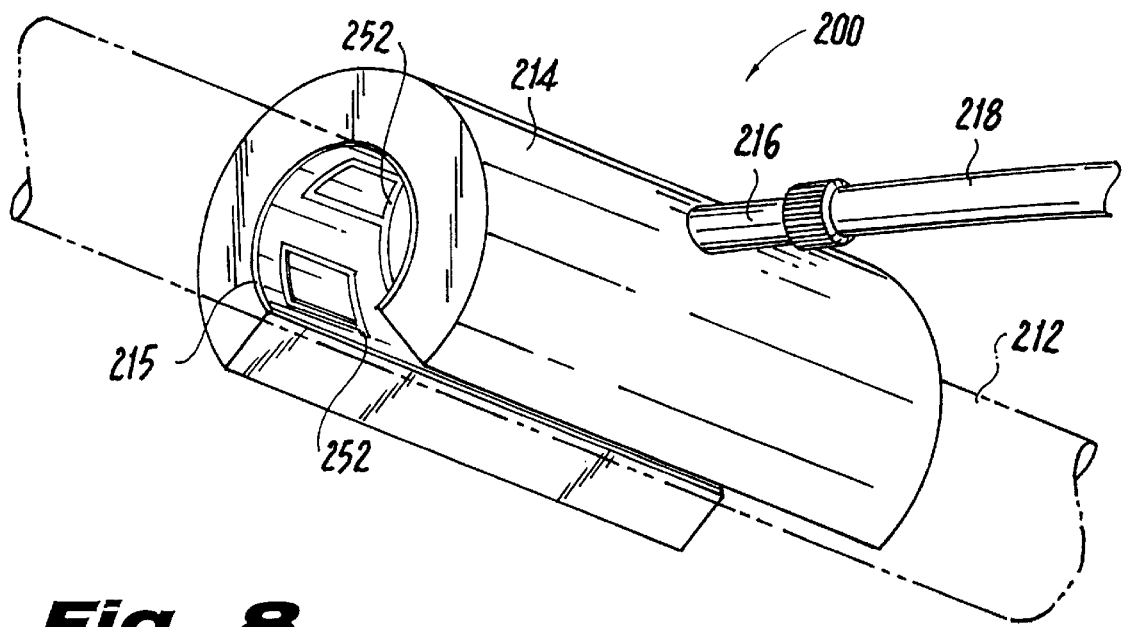
FIG. 7 is a perspective view of another alternate embodiment of the hydrostatic bearing assembly positioned on a support rail.
Figure 8:
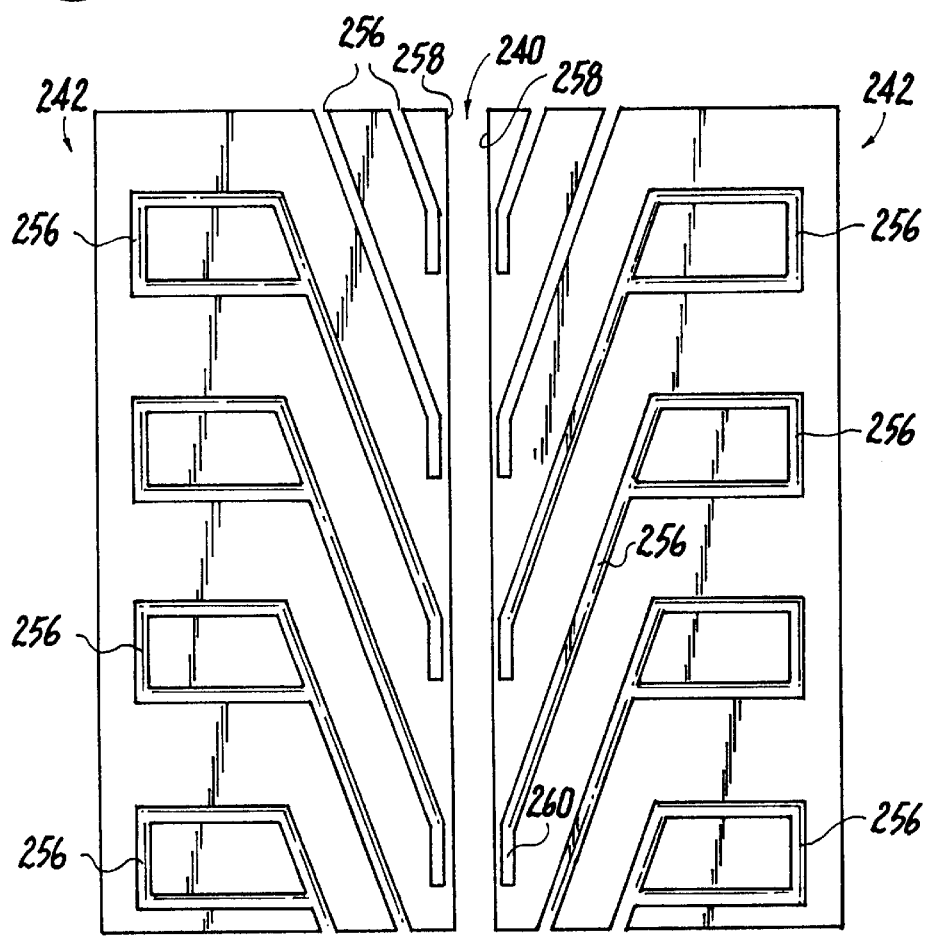
FIG. 8 is a plan view of the bearing tape of the self-compensating bearing assembly shown in FIG. 7.
Figure 9:
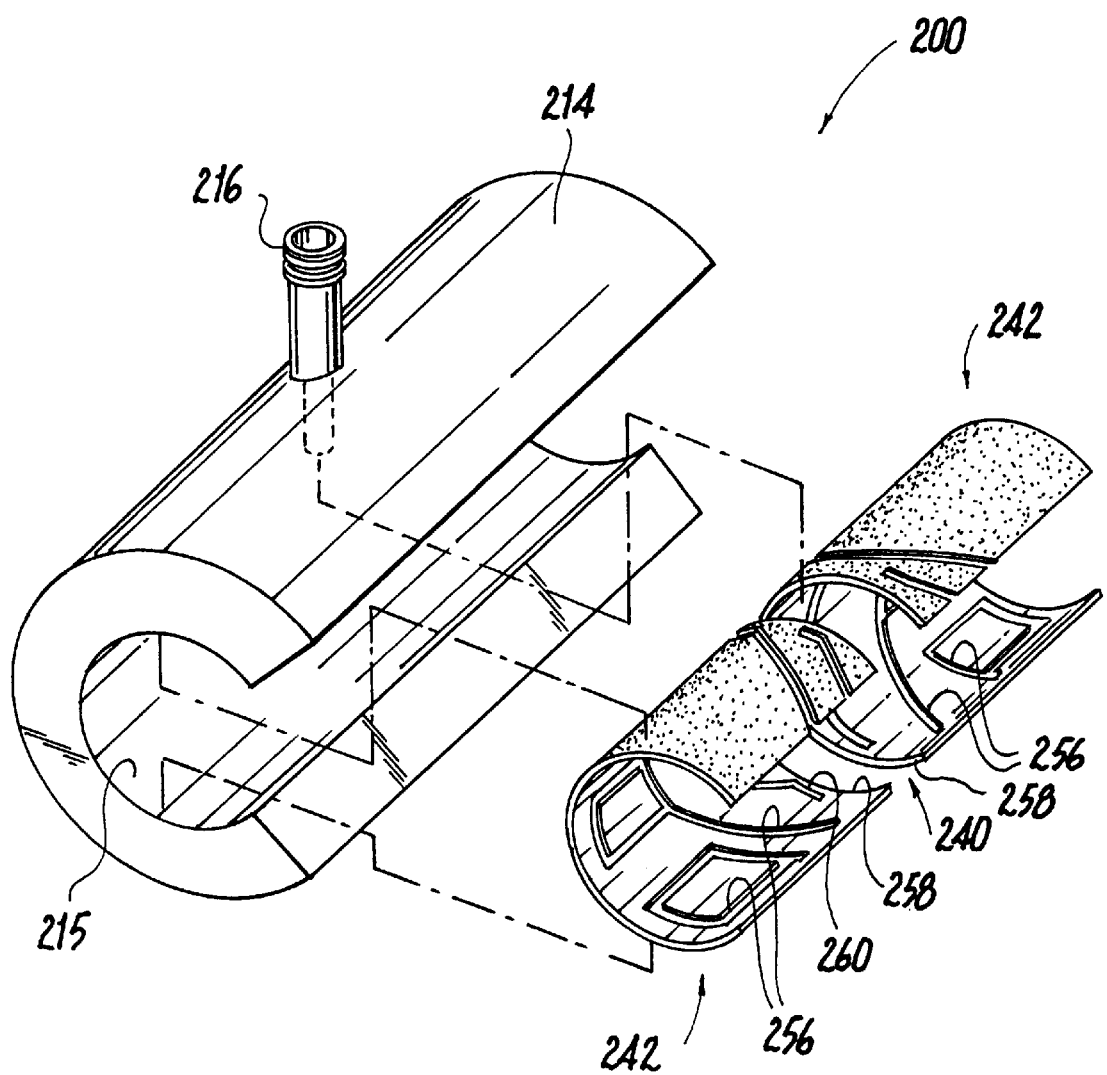
FIG. 9 is a perspective view with parts separated of the bearing assembly shown in FIG. 7.
Figure 10:
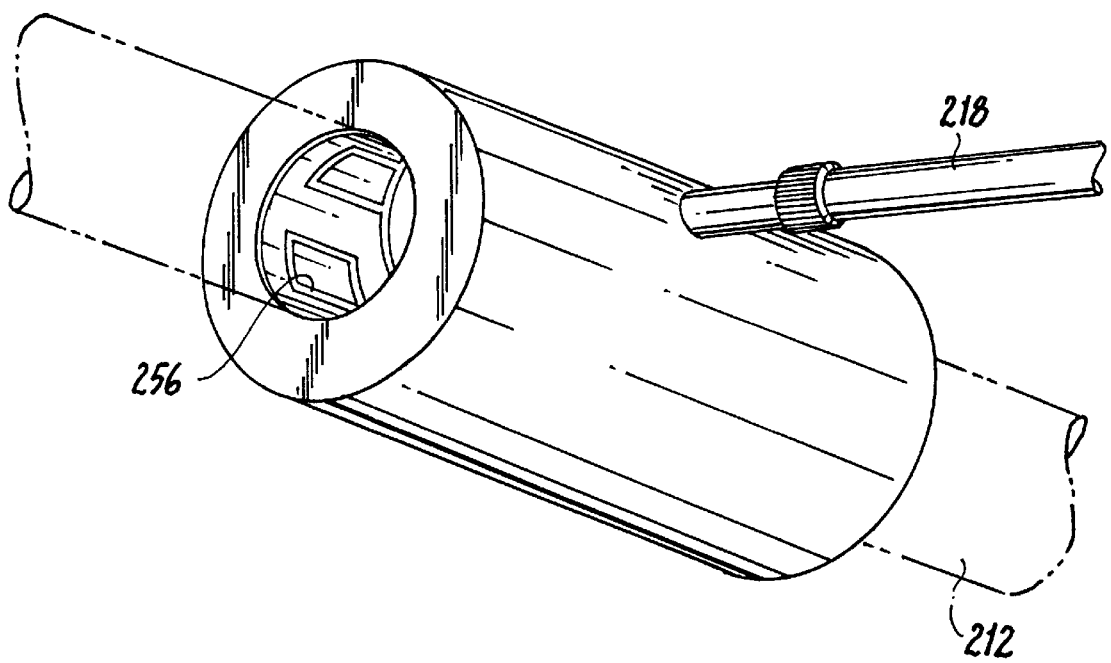
FIG. 10 is a perspective view of yet another alternate embodiment of the hydrostatic bearing assembly.

FIGS. 7–9 illustrate another alternate embodiment of the self-compensating linear motion hydrostatic bearing assembly shown generally as 200. Bearing assembly 200 includes a semi-cylindrical carriage 214 having an interior bearing surface 215 and an inlet fitting 216 adapted to receive a supply hose 218. Alternately, the bearing carriage can be fully cylindrical (See FIG. 10). Semi-cylindrical carriage 214 is configured to be slidably supported on cylindrical support rail 212. Supply hose 218 communicates with a supply of pressurized hydrostatic fluid (not shown) which supplies hydrostatic fluid to inlet fitting 216.

A pair of sheets of carriage tape 242 is bonded to interior surface 215 of semi-cylindrical carriage 214. The sheets are spaced to define a supply channel 240. Each sheet of carriage tape includes a plurality of slots 256 which together with interior surface 215 of semi-cylindrical carriage 214 define relief channels 252. Each of slots 256 radiates outwardly from an interior edge 258 of carriage tape 242 along the longitudinal axis of the tape. The interior end 260 of each slot 256 is spaced from edge 258 by a predetermined distance D.

As discussed above, carriage tape 242 may be processed from a high performance polymer, such a fluorocarbon filled with polytetrafluoroethylene (PTFE). The tape including slots 256 may then be cut to size using a technique such as stamping. The tape may be finished by either milling or grinding to a finished dimension to achieve a close fit with support rail 212.

During operation of bearing assembly 200, hydrostatic fluid is supplied to inlet fitting 216 and into supply channel 240 positioned between the two sheets of bearing tape. The hydrostatic fluid flows from supply channel 240 into the gap 272 defined between carriage tape 242 and support rail 212. Because of relief channels 252, hydrostatic fluid is evenly distributed about interior surface 215 of carriage 214 within gap 272. In the event of a loss of hydrostatic fluid pressure, bearing tape 242 provides a self-lubricating surface that prevents damage to the bearing and/or a load supported thereon.

It will be understood that various modifications may be made to the embodiments disclosed herein. For example, the particular configuration of the carriage tape may be other than as described herein. Moreover, the bearing assembly may be of a variety of different types and configurations. Therefore, the above description should not be construed as limiting, but merely as exemplifications of preferred embodiments. Those skilled in the art will envision other modifications within the scope and spirit of the claims appended thereto.

What is claimed is:

1. A bearing assembly comprising:
   a support rail;
   a carriage slidably supported on the support rail, the carriage having a bearing surface positioned opposite to the support rail; and
   bearing tape bonded to the bearing surface between the bearing surface and the support rail, the bearing tape and the support rail defining a bearing gap,
   wherein the bearing assembly is adapted to receive a supply of pressurized hydrostatic fluid in the bearing gap.

2. A bearing assembly according to claim 1, wherein the bearing tape defines at least one compensator, the at least one compensator including a supply opening, a collector and an elongated pocket.

3. A bearing assembly according to claim 2, further including a manifold having at least one compensation channel secured to the carriage, each of the at least one compensation channels having a first end communicating with one of the collectors and a second end communicating with one of the elongated pockets, wherein each of the collectors and compensation channels are configured to direct hydrostatic fluid from a first location on the bearing surface to a second location on the bearing surface.

4. A bearing assembly according to claim 3, wherein the bearing surface includes a pair of upper and a pair of lower bearing races, and wherein the at least one compensation channel includes four compensation channels, each of the compensation channels being configured to direct hydrostatic fluid from adjacent one of the bearing races to a location adjacent another of the bearing surfaces.

5. A bearing assembly according to claim 4, wherein each of the compensation channels is configured to direct hydrostatic fluid from adjacent one of the bearing races to a location adjacent a diagonally opposed bearing race.

6. A bearing assembly according to claim 3, further including at least one supply port formed in the carriage, the supply port having an inlet adapted to receive a supply of pressurized hydrostatic fluid and an outlet communicating with the supply opening in the bearing tape.

7. A bearing assembly according to claim 6, further including at least one return port formed in the carriage, the at least one return port having an inlet communicating with the collector and an outlet communicating with the first end of the at least one compensator channel.

8. A bearing assembly according to claim 7, further including a working port formed in the carriage, the working port having an inlet communicating with the second end of the at least one compensation channel and an outlet communicating with the elongated pocket.

9. A bearing assembly according to claim 1, wherein the carriage tape is processed from a self-lubricating material.

10. A bearing assembly according to claim 9, wherein the carriage tape includes a plurality of slots which together with the carriage define supply channels, the supply channels being configured to distribute hydrostatic fluid about the bearing surface.

11. A bearing assembly according to claim 1, wherein the carriage tape is processed from a high performance polymer.

12. A bearing assembly according to claim 11, wherein the high performance polymer is polytetrafluoroethylene.

13. A bearing assembly according to claim 1, wherein the bearing carriage has a semi-cylindrical shape and the support rail is cylindrical.

14. A bearing assembly according to claim 1, wherein the bearing carriage and support rail are cylindrical.

15. A method of manufacturing a self-compensating hydrostatic bearing assembly, the method comprising the following steps:
   a) forming a bearing carriage configured to be supported on a rail and having at least one bearing surface;
   b) providing carriage tape having compensators formed therein; and
   c) bonding the carriage tape to the at least one bearing surface.

16. A method according to claim 15, wherein the step of providing carriage tape includes providing self-lubricating carriage tape.

17. A method according to claim 15, wherein the step of bonding the carriage tape to the bearing surface includes bonding the tape to the bearing surface with an adhesive.

18. A method according to claim 17, wherein the adhesive is an epoxy.

19. A method according to claim 17, wherein the adhesive is a cyanoacrylate.

* * * * *